US010087325B2

(12) United States Patent
Coupin (10) Patent No.: US 10,087,325 B2
(45) Date of Patent: *Oct. 2, 2018

(54) POLYLACTIDE BASED COMPOSITIONS

(71) Applicant: Total Research & Technology Feluy, Seneffe (Felury) (BE)

(72) Inventor: Thierry Coupin, Carnieres (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/306,810

(22) PCT Filed: Apr. 28, 2015

(86) PCT No.: PCT/EP2015/059244
§ 371 (c)(1),
(2) Date: Oct. 26, 2016

(87) PCT Pub. No.: WO2015/165919
PCT Pub. Date: Nov. 5, 2015

(65) Prior Publication Data
US 2017/0037242 A1    Feb. 9, 2017

(30) Foreign Application Priority Data
Apr. 29, 2014  (EP) .................... 14166458

(51) Int. Cl.
*C08L 67/04* (2006.01)
*C08J 3/00* (2006.01)

(52) U.S. Cl.
CPC ............ *C08L 67/04* (2013.01); *C08J 3/005* (2013.01); *C08J 2367/04* (2013.01); *C08J 2453/00* (2013.01)

(58) Field of Classification Search
CPC .. C08L 67/04; C08L 3/02; C08L 53/00; C08L 2205/03
See application file for complete search history.

(56) References Cited

U.S. PATENT DOCUMENTS

| 6,087,465 A * | 7/2000 | Seppala ............ C08G 18/4283 525/450 |
| 2010/0121024 A1* | 5/2010 | Magnet ................. C08G 63/08 528/354 |
| 2012/0189860 A1 | 7/2012 | Li et al. |

FOREIGN PATENT DOCUMENTS

| EP | 1279687 A2 * | 1/2003 | ............. C08G 18/10 |
| EP | 2476729 A1 | 7/2012 | |
| FR | 2953218 * | 6/2011 | ............. C08L 67/04 |
| FR | 2953218 A1 | 6/2011 | |
| WO | 2008037772 A1 | 4/2008 | |
| WO | 2010133419 A2 | 11/2010 | |
| WO | 2011144625 A1 | 11/2011 | |

OTHER PUBLICATIONS

EP Application No. 11167138; "Process for the Polymerization of Cyclic Carbonates"; Filing date: May 23, 2011; 24 pages.
International Search Report issued in PCT/EP2015/059244, dated Jul. 8, 2015, 4 pages.
Na-Youn Kim et al, "Enhanced impact properties of polylactide by poly(lactide-b-butadiene-b-lactide) triblock copolymer", Macromolecular Research, (Aug. 12, 2011), vol. 19, No. 9, pp. 943-947.

* cited by examiner

*Primary Examiner* — Kara Brady Boyle
(74) *Attorney, Agent, or Firm* — Albert Shung (57) ABSTRACT

Embodiments of polylactide based compositions are disclosed herein. The compositions may comprise at least one first polymer selected from polylactide-polybutadiene (PLA-PB) block copolymer, polylactide-urethane-polybutadiene block copolymer, or a mixture thereof; and at least one second polymer selected from polylactide, polylactide-urethane, or a mixture thereof. The composition may also comprise from 20% to 50% by weight of said first polymer based on the total weight of the composition and from 50% to 80% by weight of said second polymer based on the total weight of the composition. Embodiments of the present invention also relate to a process for preparing the polylactide based compositions and articles comprising the polylactide compositions.

8 Claims, 1 Drawing Sheet

POLYLACTIDE BASED COMPOSITIONS

CROSS-REFERENCE TO RELATED APPLICATIONS

This application claims the benefit of PCT/EP2015/059244, filed Apr. 28, 2015, which claims priority from EP 14166458.1, filed Apr. 29, 2014.

FIELD OF THE INVENTION

The invention pertains to a composition comprising a polylactide-based polymer, and the use thereof.

BACKGROUND OF THE INVENTION

Polylactide also referred as polylactic acid (PLA) is a synthetic aliphatic polyester derived from renewal resources, such a corn, sugar beet and cassava, which can ultimately be degraded under composting conditions.

Although attempts have been made to utilize PLA for various end-use applications, PLA is known to be brittle and exhibit low toughness, which can result in low impact strength products or articles. Impact resistance of PLA can be modified by using existing polymeric impact modifiers; however, currently available polymeric impact modifiers always decrease transparency of PLA material. A liquid plasticizer can be used at high content (>15%) to improve impact resistance of PLA, however during the life time of the PLA blend, there is migration of the plasticizer.

Impact modifiers such as rubber, poly(ethylene glycol) (PEG), and acrylonitrile-butadiene-styrene copolymer (ABS) have been tested. Nevertheless, the immiscibility between these impact modifying additives and the PLA matrix is a major drawback.

Commercially available BioStrength® 150 a methyl methacrylate-butadiene-styrene co-polymer (MBS) is one of the best currently available impact modifiers for PLA; however haze of the resulting PLA material increases from 5, for pure PLA to 95 when 15% w/w of BioStrength® 150 is added. Another commercial product, BioStrength® 280, an acrylic core shell impact modifier, is a less efficient impact modifier, although the resulting PLA material is said to remain transparent. Nevertheless, the present inventors observed that addition of 15% w/w of BioStrength® 280 produces a material with a haze of 44.

Plasticizers are additives that increase the fluidity of a material. Commonly used plasticizers, are tributyl citrate (TBC) and acetyl tributyl citrate (ATBC). However, when 15% TBC or ATBC were mixed with PLA, the present inventors observed a plasticizer migration after storage for a few days at room temperature in summer time (25-30° C.).

Other commonly used polymer modifiers are styrene block copolymers, such as poly(styrene-butadiene-styrene), or SBS. Further studies performed by the present inventors, showed that a blend of PLA with SBS exhibited a total incompatibility even at a concentration as low as 10% w/w of SBS.

There is therefore a need to improve the compositions of the prior art.

SUMMARY OF THE INVENTION

Surprisingly it has been discovered that polylactide-polybutadiene (PLA-PB) block copolymer, or polylactide-urethane-polybutadiene block copolymer, or mixture thereof, increases significantly the impact properties of PLA based composition in comparison to polylactide based composition alone, or with standard impact modifiers.

It has been also discovered that compositions comprising at least one PLA based polymer and polylactide-polybutadiene (PLA-PB) block copolymer, or polylactide-urethane-polybutadiene block copolymer, or mixture thereof, have a better impact performance than the same compositions with standard impact modifiers. The compositions have also improved transparency, while keeping other properties such as processing.

A first aspect of the present invention provides a composition comprising:

(a) at least one first polymer selected from polylactide-polybutadiene (PLA-PB) block copolymer, polylactide-urethane-polybutadiene block copolymer, or a mixture thereof; and (b) at least one second polymer selected from polylactide, polylactide-urethane, or a mixture thereof. Preferably, the composition comprises from 20% to 50% by weight of said first polymer based on the total weight of the composition and from 50% to 80% by weight of said second polymer based on the total weight of the composition.

The present inventors have surprisingly found that it is possible to produce composition having improved melt strength, and impact.

A second aspect of the present invention encompasses a process for preparing a composition according to the first aspect of the invention, said process comprising the step of contacting (a) at least one first polymer selected from polylactide-polybutadiene (PLA-PB) block copolymer, polylactide-urethane-polybutadiene block copolymer, or a mixture thereof;

with (b) at least one second polymer selected from polylactide, polylactide-urethane, or a mixture thereof.

A third aspect of the invention encompasses an article comprising a composition according to the first aspect of the invention, or prepared using a process according to the second aspect of the invention.

A fourth aspect of the invention encompasses the use of polylactide-polybutadiene (PLA-PB) block copolymer, or polylactide-urethane-polybutadiene block copolymer, or a mixture thereof as impact modifier. The inventors have surprisingly shown that when polylactide-polybutadiene (PLA-PB) block copolymer, or polylactide-urethane-polybutadiene block copolymer were used as impact modifier, the composition containing said modifiers displayed better performance.

By better performance is meant that the impact modifier performs either better in terms of the impact strength used at the same quantity as the nowadays-available standard impact modifiers or the same impact strength is obtained by incorporating a less quantity of the impact modifier in comparison the nowadays-available standard impact modifiers in a thermoplastic resin, while keeping other characteristics.

The above and other characteristics, features and advantages of the present invention will become apparent from the following detailed description, taken in conjunction with the accompanying drawings, which illustrate, by way of example, the principles of the invention. The reference figures quoted below refer to the attached drawings.

DETAILED DESCRIPTION OF THE INVENTION

When describing the invention, the terms used are to be construed in accordance with the following definitions, unless a context dictates otherwise.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

As used in the specification and the appended claims, the singular forms "a", "an," and "the" include plural referents unless the context clearly dictates otherwise. By way of example, "a layer" means one layer or more than one layer.

Unless defined otherwise, all technical and scientific terms used herein have the same meaning as is commonly understood by one of skill in the art. All publications referenced herein are incorporated by reference thereto.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2.0, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Whenever the term "substituted" is used in the present invention, it is meant to indicate that one or more hydrogens on the atom indicated in the expression using "substituted" is replaced with a selection from the indicated group, provided that the indicated atom's normal valency is not exceeded, and that the substitution results in a chemically stable compound, i.e. a compound that is sufficiently robust to survive isolation to a useful degree of purity from a reaction mixture. Suitable substituents can be selected from $C_{1-6}$alkyl, halogen, hydroxy, $C_{1-6}$alkoxy.

The term "$C_{1-20}$alkyl", as a group or part of a group, refers to a hydrocarbyl radical of Formula $C_nH_{2n+1}$ wherein n is a number ranging from 1 to 20. Generally, the alkyl groups comprise from 1 to 20 carbon atoms, preferably from 1 to 12 carbon atoms, preferably from 1 to 10 carbon atoms, preferably from 1 to 6 carbon atoms, more preferably 1, 2, 3, 4, 5, 6 carbon atoms. Alkyl groups may be linear, or branched and may be substituted as indicated herein. When a subscript is used herein following a carbon atom, the subscript refers to the number of carbon atoms that the named group may contain. Thus, for example, $C_{1-20}$alkyl groups include all linear, or branched alkyl groups having 1 to 20 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers, undecyl and its isomers, dodecyl and its isomers, tridecyl and its isomers, tetradecyl and its isomers, pentadecyl and its isomers, hexadecyl and its isomers, heptadecyl and its isomers, octadecyl and its isomers, nonadecyl and its isomers, icosyl and its isomers, and the like. For example, $C_{1-10}$alkyl includes all linear, or branched alkyl groups having 1 to 10 carbon atoms, and thus includes for example methyl, ethyl, n-propyl, propyl, 2-methyl-ethyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers and the like. For example, $C_{1-6}$alkyl includes all linear, or branched alkyl groups having 1 to 6 carbon atoms, and thus includes for example methyl, ethyl, n-propyl, i-propyl, 2-methyl-ethyl, butyl and its isomers (e.g. n-butyl, i-butyl and t-butyl); pentyl and its isomers, hexyl and its isomers. When the suffix "ene" is used in conjunction with an alkyl group, i.e. "alkylene", this is intended to mean the alkyl group as defined herein having two single bonds as points of attachment to other groups.

The term "$C_{1-6}$alkoxy" or "$C_{1-6}$alkyloxy", as a group or part of a group, refers to a group having the Formula $—OR^a$ wherein $R^a$ is $C_{1-6}$alkyl. Non-limiting examples of suitable $C_{1-6}$alkoxy include methoxy, ethoxy, propoxy, isopropoxy, butoxy, isobutoxy, sec-butoxy, tert-butoxy, pentyloxy and hexyloxy.

The term "$C_{3-6}$cycloalkyl", as a group or part of a group, refers to a cyclic alkyl group, that is to say, a monovalent, saturated, hydrocarbyl group having 1 or more cyclic structure, and comprising from 3 to 9 carbon atoms, more preferably from 3 to 8 carbon atoms, more preferably from 3 to 6 carbon atoms, still more preferably from 5 to 6 carbon atoms. Cycloalkyl includes all saturated hydrocarbon groups containing 1 or more rings, including monocyclic or bicyclic groups. The further rings of multi-ring cycloalkyls may be either fused, bridged and/or joined through one or more spiro atoms. Examples of $C_{3-6}$cycloalkyl groups include but are not limited to cyclopropyl, cyclobutyl, cyclopentyl, cyclohexyl. When the suffix "ene" is used in conjunction with a cycloalkyl group, i.e. cycloalkylene, this is intended to mean the cycloalkyl group as defined herein having two single bonds as points of attachment to other groups.

The term "$C_{6-30}$aryl", as a group or part of a group, refers to a polyunsaturated, aromatic hydrocarbyl group having a single ring (i.e. phenyl) or multiple aromatic rings fused together (e.g. naphthalene), or linked covalently, typically containing 6 to 30 atoms; wherein at least one ring is aromatic. Examples of suitable aryl include $C_{6-12}$aryl, more preferably $C_{6-10}$aryl. Non-limiting examples of $C_{6-12}$aryl comprise phenyl, biphenylyl, biphenylenyl, or 1- or 2-naphthanelyl. When the suffix "ene" is used in conjunction with an aryl group, this is intended to mean the aryl group as defined herein having two single bonds as points of attachment to other groups.

The term "halo" or "halogen", as a group or part of a group, is generic for fluoro, chloro, bromo or iodo.

The term "hydroxyl" or "hydroxy", as a group or part of a group, refers to the group —OH.

The terms described above and others used in the specification are well understood to those in the art.

Preferred statements (features) and embodiments of the compositions, polymers, processes, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered aspects and embodiments 1 to 21, with any other statement and/or embodiment.

1. A composition comprising:
    (a) at least one first polymer selected from polylactide-polybutadiene (PLA-PB) block copolymer, polylactide-urethane-polybutadiene block copolymer, or a mixture thereof; and
    (b) at least one second polymer selected from polylactide, polylactide-urethane, or a mixture thereof.
2. A composition comprising:
    (a) at least one first polymer selected from polylactide-polybutadiene (PLA-PB) block copolymer, polylactide-urethane-polybutadiene block copolymer, or a mixture thereof; and
    (b) at least one second polymer selected from polylactide, polylactide-urethane, or a mixture thereof;
    wherein the composition comprises from 20% to 50% by weight of said first polymer based on the total weight of the composition and from 50% to 80% by weight of said second polymer based on the total weight of the composition
3. The composition according to statement 1 or 2, wherein the at least one first polymer is polylactide-polybutadiene (PLA-PB) block copolymer and the at least one second polymer is selected from polylactide.
4. The composition according to any one of statements 1 to 3, wherein the at least one first polymer is poly-L-lactide-polybutadiene (PLLA-PB) block copolymer and the at least one second polymer is selected from poly-L-lactide.
5. The composition according to any one of statements 1 to 4, wherein said polylactide-polybutadiene (PLA-PB) block copolymer is selected from the group comprising PLA-PB diblock copolymer, PLA-PB-PLA triblock copolymer, PLA-PB multiblock copolymer, PLA-PB star copolymers, PLA-PB comb copolymers, PLA-PB gradient containing block copolymers; and mixtures thereof.
6. The composition according to any one of statements 1, 3 to 5, wherein said composition comprises from 1 to 60% by weight of said first polymer based on the total weight of the composition; preferably, said composition comprises from 2 to 55% by weight of said first polymer based on the total weight of the composition.
7. The composition according to any one of statements 1, 3 to 6, wherein said composition comprises from 40 to 99% by weight of said second polymer based on the total weight of the composition.
8. The composition according to any one of statements 1, 3 to 7, comprising from 1% to 60% composition; and from 40% to 99% by weight of the second polymer (b) based on the total weight of the composition.
9. The composition according to any one of statements 1, 3 to 8, comprising from 1% to 60% by weight of polylactide-polybutadiene block copolymer based on the total weight of the composition; and from 40% to 99% by weight of polylactide (b) based on the total weight of the composition.
10. The composition according to any one of statements 1 to 9, wherein said composition is obtained by melt blending the at least one first polymer with the at least one second polymer
11. The composition according to any one of statements 1 to 10, comprising from 25% to 50% by weight of polylactide-polybutadiene block copolymer based on the total weight of the composition; and from 50% to 75% by weight of the second polymer (b) based on the total weight of the composition.
12. The composition according to any one of statements 1 to 11, comprising from 25% to 50% by weight of polylactide-polybutadiene block copolymer based on the total weight of the composition; and from 50% to 75% by weight of polylactide (b) based on the total weight of the composition.
13. A process for preparing a composition according to any one of statements 1 to 12 comprising the step of
    contacting (a) at least one first polymer selected from polylactide-polybutadiene (PLA-PB) block copolymer, polylactide-urethane-polybutadiene block copolymer, or a mixture thereof;
    with (b) at least one second polymer selected from polylactide, polylactide-urethane, or a mixture thereof.
14. A process for preparing a composition according to any one of statements 1 to 12 comprising the step of
    contacting (a) at least one first polymer selected from polylactide-polybutadiene (PLA-PB) block copolymer, polylactide-urethane-polybutadiene block copolymer, or a mixture thereof;
    with (b) at least one second polymer selected from polylactide, polylactide-urethane, or a mixture thereof;
    wherein the composition comprises from 20% to 50% by weight of said first polymer based on the total weight of the composition and from 50% to 80% by weight of said second polymer based on the total weight of the composition.
15. The process according to statement 13 or 14, wherein said contacting step comprises melt blending the at least one first polymer with the at least one second polymer.
16. The process according to any one of statements 13 to 15, wherein said composition is melt blended at a temperature ranging from 160° C. to 230° C., preferably at a temperature ranging from 160° C.-200° C.
17. The process according to any one of statements 13 to 16, comprising melt processing a blend comprising polylactide-polybutadiene (PLA-PB) block copolymer and polylactide.
18. The process according to any one of statements 13 to 17, comprising melt blending from 25% to 50% by weight of polylactide-polybutadiene block copolymer; and from 50% to 75% by weight of polylactide.
19. The process according to any one of statements 13 to 18, further comprising processing the composition using one or more polymer processing techniques selected from film, sheet, pipe and fiber extrusion or coextrusion; blow molding; injection molding; rotary molding; foaming; and thermoforming.

20. An article comprising a composition according to any one of statements 1 to 12, or formed using a process according to any one of statements 13 to 19.

21. Use of polylactide-polybutadiene (PLA-PB) block copolymer, polylactide-urethane-polybutadiene block copolymer, or mixtures thereof as impact modifier.

According to the first aspect, a composition is provided comprising:

(a) at least one first polymer selected from polylactide-polybutadiene (PLA-PB) block copolymer, polylactide-urethane-polybutadiene block copolymer, or a mixture thereof; and (b) at least one second polymer selected from polylactide, polylactide-urethane, or a mixture thereof. In a preferred embodiment, the composition comprises from 20% to 50% by weight of said first polymer based on the total weight of the composition and from 50% to 80% by weight of said second polymer based on the total weight of the composition.

Preferably, according to the first aspect, a composition is provided comprising (a) polylactide-polybutadiene (PLA-PB) block copolymer; and (b) at least one second polymer selected from polylactide, polylactide-urethane, or a mixture thereof.

Preferably, the composition comprises: (a) polylactide-polybutadiene (PLA-PB) block copolymer; and (b) polylactide.

For example, the composition can comprise:

(a1) at least one first polymer selected from the group comprising poly-L-lactide-polybutadiene (PLLA-PB) block copolymer, poly-D-lactide-polybutadiene (PDLA-PB) block copolymer, poly-DL-lactide-polybutadiene (PDLLA-PB) block copolymer, poly(meso)-lactide-polybutadiene block copolymer, poly-L-lactide-urethane-polybutadiene (PLLA-PB) block copolymer, poly-D-lactide-(PDLLA-PB) block copolymer, poly(meso)-lactide-urethane-polybutadiene block copolymer, and mixture thereof, and (b1) at least one second polymer selected from the group comprising poly-L-lactide, poly-D-lactide, poly-DL-lactide, poly-meso-lactide, and mixture thereof.

The present composition comprises (a) at least one first polymer selected from polylactide-polybutadiene (PLA-PB) block copolymer, polylactide-urethane-polybutadiene block copolymer, or a mixture thereof.

The first polymer is a block copolymer. Suitable block copolymer comprises polymer comprising multiple sequences, or blocks, of the same monomer alternating in series with different monomer blocks; these blocks are covalently bound to each other. Block copolymers are normally prepared by controlled polymerization of one monomer, followed by chain extension with a different monomer. Block copolymers are classified based on the number of blocks they contain and how the blocks are arranged. For example, block copolymers with two blocks are called diblocks; those with three blocks are triblocks; and those with more than three are generically called multiblocks. Classifications by arrangement include the linear, or end-to-end, arrangement and the star arrangement, in which one polymer is the base for multiple branches. In an embodiment, said block copolymer is selected from diblock copolymer, triblock copolymer, multiblock copolymer, star copolymers, comb copolymers, gradient containing block copolymers, and other copolymers having a blocky structure, which will be known by those skilled in the art. Preferred are diblock and triblock copolymers. An example of a gradient containing block copolymer is when the monomer or monomers used from one segment are allowed to further react as a minor component in the next sequential segment. For example, if the monomer mix used for the 1st block (A block) of an AB diblock copolymer is polymerized to only 80% conversion, then the remaining 20% of the unreacted monomer is allowed to react with the new monomers added for the B block segment, the result is an AB diblock copolymer in which the B segment contains a gradient of the A segment composition. The term "comb copolymer," as used herein, describes a type of graft copolymer, wherein the polymeric backbone of the graft copolymer is linear, or essentially linear and is made of one polymer A, and each side chain (graft segment) of the graft copolymer is formed by a polymer B that is grafted to the polymer A backbone. Used herein, the terms "comb copolymer" and "graft copolymer" have the same meaning.

In an embodiment, said polylactide-polybutadiene (PLA-PB) block copolymer is selected from the group comprising PLA-PB diblock copolymer, PLA-PB-PLA triblock copolymer, PLA-PB multiblock copolymer, PLA-PB star copolymers, PLA-PB comb copolymers, and PLA-PB gradient containing block copolymers. Preferable diblock and triblock copolymers include PLA-PB and PLA-PB-PLA block copolymers.

In an embodiment, the polylactide-polybutadiene block copolymer is produced by combining a lactide (such as L-lactide, D-lactide, LD-lactide, meso-lactide or mixture thereof with a polybutadiene, preferably a hydroxy functionalized polybutadiene. Lactide includes L-lactide, which is a cyclic dimer of L-lactic acid (also referred as "L-L-lactide" or "(S,S)-lactide"=cyclic di-ester of two lactic acid S enantiomers); D-lactide, which is a cyclic dimer of D-lactic acid (also referred as "D-D-lactide" or "(R,R)-lactide"=cyclic di-ester of two lactic acid R enantiomers); meso-lactide, which is a cyclic dimer of D-lactic acid and L-lactic acid; and DL-lactide, which is a racemate of D-lactide and L-lactide. In a preferred embodiment, the polylactide-polybutadiene block copolymer is produced by combining a lactide selected from the group comprising L-lactide, D-lactide, LD-lactide, meso-lactide or a mixture thereof with a polybutadiene, preferably a hydroxy functionalized polybutadiene. In one or more embodiments, the block copolymer is produced by melt blending a lactide and a hydroxy functionalized polybutadiene. Such processes may utilize catalysts for polylactic acid formation, such as tin compounds (e.g., tin octylate), titanium compounds (e.g., tetraisopropyl titanate), zirconium compounds (e.g., zirconium isopropoxide), antimony compounds (e.g., antimony trioxide) or combinations thereof, for example.

In some embodiments, it can be desirable to use lactide stereochemistry DD or LL having an optical purity also called isomeric purity L- or D of at least 70% by weight, for example at least 80%, for example at least 90%, for example at least 95%, for example at least 98% by weight.

Among the hydroxyl-terminated polybutadienes that are useful for preparing the block copolymers are those possessing a number average molecular weight (Mn) of at least 1000 g/mol, for example at least 5000 g/mol, preferably at least 10000 g/mol. In some embodiments the hydroxyl-terminated polybutadienes possess a Mn ranging from 1000 to 20000 g/mol, for example from 5000 to 25000 g/mol, and advantageously from 8000 to 20000 g/mol, and advantageously from 9000 to 20000 g/mol, and advantageously from 10000 to 20000 g/mol.

Among the hydroxyl-terminated polybutadienes that are useful for preparing the block copolymers are those possessing a hydroxyl group content of from 0.10 to 3.0 Mmol/g.

Hydroxyl-terminated polybutadienes of the above-described type, averaging more than one predominantly primary hydroxyl group per molecule, e.g., averaging from 1.5 to 3 or more primary hydroxyl groups per molecule, can be suitably employed herein. Branched hydroxyl-terminated polybutadienes can possess an average of at least 1.90, and advantageously from 1.95 up to 2.8 hydroxyl groups per molecule, the hydroxyl groups being predominantly in terminal positions on the main, i.e., the terminal hydroxyl groups of the polymer, are bonded to carbon atoms adjacent to double bonded carbon atoms.

The useful hydroxyl-terminated polybutadienes herein can also incorporate one or more other copolymerizable monomers that can confer particularly desirable properties upon the copolymers herein and the compositions prepared therewith. Included among the copolymerizable monomers are mono-olefins and dienes such as ethylene, propylene, 1-butene, isoprene, chloroprene, 2,3-methyl-1,3-butadiene, 1,4-pentadiene, etc., and, ethylenically unsaturated monomers such as acrylonitrile, methacrylonitrile, methylstyrene, methyl acrylate, methyl methacrylate, vinyl acetate, isocyanate, etc. Alternatively or in addition thereto, the hydroxyl-terminated polybutadienes can be reacted with one or more other monomers to provide hydroxyl-terminated block copolymers. Such monomers include 1,2-epoxides such as ethylene oxide and propylene oxide which will provide polyether segments, e-caprolactone which will provide polyester segments, and the like.

Hydroxyl-terminated polybutadienes possessing these characteristics are commercially available from several sources and are therefore conveniently employed herein.

Examples of suitable hydroxyl-terminated polybutadiene include but are not limited to Krasol® LBH 10000, Krasol® LBH 2000, Krasol® LBH 3000 and Krasol® LBH 5000, Krasol® LBH-P 2000, Krasol® LBH-P 3000, Krasol® LBH-P 5000, Poly Bd® R45HTLO, Poly Bd® R20LM commercially available from HSC Cray Valley Corp., as well as the epoxidized hydroxyl-terminated polybutadiene such as Poly Bd® 605 and Poly Bd® 600 commercially available from HSC Cray Valley Corp.

In an embodiment, said block copolymer comprises at least 10% by weight of hydroxyl functionalized polybutadiene based on the total weight of the block copolymer. In an embodiment, said block copolymer comprises from 10% to 90% by weight of hydroxyl functionalized polybutadiene based on the total weight of the block copolymer.

The present invention is directed towards the use of such block copolymers (a) as impact modifier to improve the impact strength of the second polymer (b).

In some embodiments, the composition may comprise from 1 to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight of said at least one first polymer (a) based on the total weight of the composition.

In a preferred embodiment, the composition comprises from 20% to 50% by weight, for example from 20% to 45% by weight, for example from 25% to 50% by weight, for example from 25% to 45% by weight of said at least one first polymer (a) based on the total weight of the composition.

In an embodiment, said at least one first polymer (a) is polylactide-polybutadiene (PLA-PB) block copolymer and the at least one second polymer (b) is polylactide, preferably wherein the composition comprises 1 to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight of said at least one first polymer (a) based on the total weight of the composition.

In a preferred embodiment, the composition comprises from 20% to 50% by weight, for example from 20% to 45% by weight, for example from 25% to 50% by weight, for example from 25% to 45% by weight of said at least one first polymer (a) based on the total weight of the composition.

In an embodiment, said at least one first polymer (a) is poly-L-lactide-polybutadiene (PLLA-PB) block copolymer and the at least one second polymer (b) is poly-L-lactide, preferably wherein the composition comprises 1 to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight of said at least one first polymer (a) based on the total weight of the composition.

In a preferred embodiment, said at least one first polymer (a) is poly-L-lactide-polybutadiene (PLLA-PB) block copolymer and the at least one second polymer (b) is poly-L-lactide, and the composition comprises 20% to 50% by weight, for example from 20% to 45% by weight, for example from 25% to 50% by weight, for example from 25% to 45% by weight of said at least one first polymer (a) based on the total weight of the composition.

In an embodiment, said at least one first polymer (a) is poly-D-lactide-polybutadiene (PDLA-PB) block copolymer and the at least one second polymer (b) is poly-D-lactide, preferably wherein the composition comprises 1 to 60% by weight of said first polymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight of said at least one first polymer (a) based on the total weight of the composition.

In a preferred embodiment, said at least one first polymer (a) is poly-D-lactide-polybutadiene (PDLA-PB) block copolymer and the at least one second polymer (b) is poly-D-lactide, and the composition comprises from 20% to 50% by weight, for example from 20% to 45% by weight, for example from 25% to 50% by weight, for example from 25% to 45% by weight of said at least one first polymer (a) based on the total weight of the composition.

In an embodiment, said at least one first polymer is polylactide-urethane-polybutadiene block copolymer.

Polylactide-urethane-polybutadiene block copolymer, can be prepared by contacting a lactide (such as L-lactide, D-lactide, LD-lactide, meso-lactide or a mixture thereof) with a polybutadiene, preferably a hydroxy functionalized polybutadiene, thereby obtaining polylactide-polybutadiene block copolymer, and contacting said block copolymer with a diisocyanate compound and optionally a diamine or a dialcohol to form a polylactide-urethane-polybutadiene block copolymer. The dihydroxyl alcohol or diamine can be used as initiator. Poly-L-lactide-urethane-polybutadiene block copolymer, poly-D-lactide-urethane-polybutadiene block copolymer, poly-DL-lactide-urethane-polybutadiene block copolymer, poly-meso-lactide-urethane-polybutadiene block copolymer, can be respectively prepared by contacting an L-lactide, D-lactide, DL-lactide, or meso-lactide, respectively, with a polybutadiene, preferably a hydroxy functionalized polybutadiene, thereby obtaining polylactide-polybutadiene block copolymer, and contacting said block copolymer with a diisocyanate compound and optionally a diamine or a dialcohol to form a poly-L-lactide urethane-polybutadiene block copolymer. The dihydroxyl alcohol or diamine can be used as initiator.

Non-limiting examples of suitable diamine initiators include 1,4-diaminobutane, 1,6-diaminohexane, 1,4-diaminocyclohexane, 1,4-diaminophenyl, 4,4'-diaminodiphenylmethane. Preferably, the 1,4-diaminophenyl, 4,4'-diaminodiphenylmethane is used.

The following alcohols can be used as initiator: 1,3-propanediol, 1,3-butanediol, 1,4-butanediol, 1,6-hexanediol, 1,7-heptanediol, 1,8-octanediol, xylene glycol.

Suitable diisocyanate compounds include compounds of formula: O=C=N-L$^1$-N=C=O wherein L$^1$ can be aliphatic or aromatic. Preferably L$^1$ is selected from the group comprising C$_{4-20}$alkylene, C$_{4-6}$cycloalkylene, C$_{6-12}$arylene, C$_{6-12}$arylene-C$_{6-12}$arylene, C$_{6-12}$aryleneC$_{1-6}$alkyleneC$_{6-12}$arylene, C$_{4-6}$cycloalkyleneC$_{1-6}$alkyleneC$_{4-6}$cycloalkylene; each group being optionally substituted. For example L$^1$ can be hexamethylene, dicyclohexylmethane, diphenylmethane and the like, Non-limiting examples of suitable diisocyanates which may be used include aliphatic isocyanates such as hexamethylene diisocyanate; and aromatic isocyanates such as diphenylmethane diisocyanate (MDI) in the form of its 2,4', 2,2' and 4,4' isomers and mixtures thereof, the mixtures of diphenylmethane diisocyanates (MDI) and oligomers thereof, m- and p-phenylene diisocyanate, tolylene-2,4- and tolylene-2,6-diisocyanate (also known as toluene diisocyanate) in any suitable isomer mixture, chlorophenylene-2,4-diisocyanate, naphthylene-1,5-diisocyanate, diphenylene-4,4'-diisocyanate, 4,4'-diisocyanate-3,3'-dimethyl-diphenyl, 3-methyl-diphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane (e.g. 4,4'-diisocyanatodicyclohexylmethane (H12MDI)), isophorone diisocyanate (IPDI), butylene diisocyanate, trimethylhexamethylene diisocyanate, isocyanatomethyl-1,8-octane diisocyanate, tetramethylxylene diisocyanate (TMXDI), 1,4-cyclohexanediisocyanate (CD), and tolidine diisocyanate (TODD; any mixture thereof.

The present composition also comprises at least one second polymer (b) selected from the group comprising, consisting essentially of, or consisting of polylactide, polylactide-urethane, and mixture thereof.

The composition may comprise from 40 to 99% by weight of said second polymer (b) based on the total weight of the composition. For example, the composition may comprise 45 to 98% by weight of said second polymer (b) based on the total weight of the composition; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 45% to 70% by weight, for example from 45% to 60% by weight, for example from 45% to 55% by weight of said at least one second polymer (b) based on the total weight of the composition.

In a preferred embodiment, the composition comprises from 50% to 80% by weight, for example from 50% to 70% by weight, for example from 50% to 60% by weight, for example from 50% to 55% by weight of said at least one second polymer (b) based on the total weight of the composition.

As used herein, the terms "polylactic acid" or "polylactide" or "PLA" are used interchangeably and refer to poly (lactic acid) polymers comprising repeat units derived from lactic acid.

Polylactic acid suitable for the composition can be prepared according to any method known in the state of the art. The polylactic acid can be prepared by ring-opening polymerization of raw materials having required structures selected from lactide, which is a cyclic dimer of lactic acid, glycolide, which is a cyclic dimer of glycolic acid, and caprolactone and the like. Lactide includes L-lactide, which is a cyclic dimer of L-lactic acid, D-lactide, which is a cyclic dimer of D-lactic acid, meso-lactide, which is a cyclic dimer of D-lactic acid and L-lactic acid, and DL-lactide, which is a racemate of D-lactide and L-lactide. Random copolymers made from meso-lactide result in an atactic primary structure referred to as poly(meso-lactide) and are amorphous. Random optical copolymers made from equimolar amounts of D-lactide and L-lactide are referred to as poly-DL-lactide (PDLLA) or poly(rac-lactide) and are also amorphous.

The polylactic acid for use in the present composition also includes copolymers of lactic acid. For instance, copolymers of lactic acid and trimethylene carbonate according to EP 11167138 and copolymers of lactic acid and urethanes according to WO 2008/037772 and PCT application number PCT/EP2011/057988. Copolymeric components other than lactic acid may be used and include dicarboxylic acid, polyhydric alcohol, hydroxycarboxylic acid, lactone, or the like, which have two or more functional groups each capable of forming an ester bonding. These are, for example, polyester, polyether, polycarbonate, or the like which have the two or more unreacted functional groups in a molecule. The hydroxycarboxylic acids may be selected from the list comprising glycolic acid, hydroxybutyric acid, hydroxyvaleric acid, hydroxypentanoic acid, hydroxycaproic acid, and hydroxyheptanoic acid. In an embodiment no comonomer is used.

The poly-lactide suitable for the composition can be amorphous poly-lactide. As used herein, the term "amorphous" refers to a solid that is non-crystalline and lacks the long-range order characteristics of a crystal. For poly-lactide, the polymerization of a racemic mixture of L- and D-lactides usually leads to the synthesis of poly-DL-lactide that is amorphous. When non-racemic mixtures are being polymerized, the degree of crystallinity of the resulting polymer may be controlled by the ratio of D to L enantiomers used and/or the type of catalyst used during the polymerization reaction.

Suitable PLLA (poly-L-lactide) for use in the invention can comprise the product of a co-polymerization reaction of mainly L-lactides (or L,L-lactides) with some D lactide units. The PLLA (poly-L-lactide) suitable for the invention may comprise a content of D isomer of at least 10% by weight based on the total weight of the PLLA. Preferably, the PLLA comprises a content of D isomer of at least 20% by weight based on the total weight of the PLLA. More preferably, the PLLA comprises a content of D isomer of at least 25% by weight based on the total weight of the PLLA.

Suitable PDLA (poly-D-lactide) for use in the present invention may comprise the product of a co-polymerization reaction of mainly D-lactides (or D,D-lactides) with some L lactide units. The PDLA (poly-L-lactide) suitable for the invention may comprise a content of L isomer of at least 10% by weight based on the total weight of the PDLA. Preferably, the PDLA comprises a content of L isomer of at least 20% by weight based on the total weight of the PDLA. More preferably, the PDLA comprises a content of L isomer of at least 30% by weight based on the total weight of the PDLA.

Suitable PDLLA (poly-DL-lactide) for use in the present invention may comprise the product of a polymerization reaction of a racemic mixture of D-lactide and L-lactide. Suitable poly(meso)lactide for use in the present invention may comprise the product of a polymerization reaction of meso-lactide.

The D/L isomer content of PLA can be measured by different techniques, such as NMR, polarimetry or by enzymatic method or GCMS. Preferably, the D/L isomer content is measured by enzymatic method and/or NMR, as described for herein below. Enzymatic method: The stereochemical purity of the PLLA or of the PDLA can be determined from the respective content of L-mer or of D-mer. The terms "content of D-mer" and "content of L-mer" refer respectively to the monomer units of type D and of type L that occur in polylactide, using the enzymatic method. The principle of the method is as follows: The L-lactate and D-lactate ions are oxidized to pyruvate respectively by the enzymes L-lactate dehydrogenase and D-lactate dehydrogenase using nicotinamide-adenine dinucleotide (NAD) as coenzyme. To force the reaction in the direction of formation of pyruvate, it is necessary to trap this compound by reaction with hydrazine. The increase in optical density at 340 nm is proportional to the amount of L-lactate or of D-lactate present in the sample. The samples of PLA can be prepared by mixing 25 ml of sodium hydroxide (1 mol/L) with 0.6 g of PLA. The solution was boiled for 8 h and then cooled. The solution was then adjusted to neutral pH by adding hydrochloric acid (1 mol/L), then deionized water was added in a sufficient amount to give 200 ml. The samples were then analyzed on a Vital Scientific Selectra Junior analyzer using, for L-mer determination of poly-L-lactide acid, the box titled "L-lactic acid 5260" marketed by the company Scil and for D-mer determination of poly-D-lactide acid, the box titled "L-lactic acid 5240" marketed by the company Scil. During the analysis, a reactive blank and calibration using the calibrant "Scil 5460" are used. The presence of insertion and racemization defects can also be determined by carbon-13 nuclear magnetic resonance (NMR) (Avance, 500 MHz, 10 mm SELX probe). The samples can be prepared from 250 mg of PLA dissolved in 2.5 to 3 ml of $CDCl_3$.

PLA suitable for the invention can have high molecular weights. In a preferred embodiment, the PLA has a weight average molecular weight (Mw) of at least 40 kDa, preferably at least 100 kDa, for example at least 150 kDa. Measurement of the molecular masses may be performed at 25° C. using a liquid chromatograph WATERS 610. Firstly, a polymer solution is prepared in chloroform (1 mg polymer/ml). Then, 100 µl of this solution is taken and injected, through a filter (with pores of 0.2 µm diameter, on the chromatograph column at 25° C. Molecular masses are determined from the retention time in the column, translated in mass equivalent using a universal calibration law based on polystyrene standards. For example, ASTM practice D3016-97(2010) may be used. In an embodiment, the ratio of the weight average molecular weight (Mw) to the number average molecular weight (Mn) is generally from 1.0 to 5.0.

Preferably, PLA suitable the invention, has a number average molecular weight (Mn) ranging from 40000 to 350000 g/mol, more preferably from 50000 to 175000 g/mol, even more preferably from 60000 to 150000 g/mol. The weight average and number average molecular weight were measured by chromatography by gel permeation compared to a polystyrene standard in chloroform at 25° C.

In an embodiment, the PLA may have a density of from 1.228 $g/cm^3$ to 1.269 $g/cm^3$, for example from 1.230 $g/cm^3$ to 1.260 $g/cm^3$, for example from 1.235 $g/cm^3$ to 1.255 $g/cm^3$ as determined in accordance with ASTM D792.

In an embodiment, the polylactic acid may exhibit a melt flow rate ranging from 1 to 100 g/600 s, preferably 2 to 50 g/600 s, for example 3 to 12 g/600 s, wherein the Melt Flow Rate is measured according to ISO 1133 at 190° C. under a load of 2.16 kg.

For example, a process for preparing PLA and/or PLA suitable for the invention comprises the step of contacting at least one lactide, with a suitable catalyst, and optionally in the presence of a co-initiator. The process may be performed with or without solvent.

The catalyst employed by the process may have general formula $M(Y^1, Y^2, \ldots Y^p)_q$, in which M is a metal selected from the group comprising the elements of columns 3 to 12 of the periodic table of the elements, as well as the elements Al, Ga, In, Tl, Ge, Sn, Pb, Sb, Ca, Mg and Bi; whereas $Y^1$, $Y^2, \ldots Y^p$ are each substituents selected from the group comprising alkyl with 1 to 20 carbon atoms, aryl having from 6 to 30 carbon atoms, alkoxy having from 1 to 20 carbon atoms, aryloxy having from 6 to 30 carbon atoms, and other oxide, carboxylate, and halide groups as well as elements of group 15 and/or 16 of the periodic table; p and q are integers of from 1 to 6. As examples of suitable catalysts, we may notably mention the catalysts of Sn, Ti, Zr, Zn, and Bi; preferably an alkoxide or a carboxylate and more preferably $Sn(Oct)_2$, $Ti(OiPr)_4$, $Ti(2\text{-ethylhexanoate})_4$, $Ti(2\text{-ethylhexyloxide})_4$, $Zr(OiPr)_4$, $Bi(neodecanoate)_3$, (2,4-di-tert-butyl-6-(((2-(dimethylamino)ethyl)(methyl)amino) methyl)phenoxy)(ethoxy)zinc, or $Zn(lactate)_2$.

In an embodiment, the PLLA and/or PDLA suitable for the invention can be obtained by polymerizing (such as L-lactide, D-lactide, LD-lactide, meso-lactide or a mixture thereof), preferably in the presence of a co-initiator of formula (IV), wherein $R^{10}$ is selected from the group consisting of $C_{1-20}$alkyl, $C_{6-30}$aryl, and $C_{6-30}$aryl$C_{1-20}$alkyl optionally substituted by one or more substituents selected from the group consisting of halogen, hydroxyl, and $C_{1-6}$alkyl. Preferably, $R^{10}$ is selected from $C_{3-12}$alkyl, $C_{6-10}$aryl, and $C_{6-10}$aryl$C_{3-12}$alkyl, optionally substituted by one or more substituents, each independently selected from the group consisting of halogen, hydroxyl, and $C_{1-6}$alkyl; preferably, $R^{10}$ is selected from $C_{3-12}$alkyl, $C_{6-10}$aryl, and $C_{6-10}$aryl$C_{3-12}$alkyl, optionally substituted by one or more substituents, each independently selected from the group consisting of halogen, hydroxyl and $C_{1-4}$alkyl. The initiator can be an alcohol. The alcohol can be a polyol such as diol, triol or higher functionality polyhydric alcohol. The alcohol may be derived from biomass such as for instance glycerol or propanediol or any other sugar-based alcohol such as for example erythritol. The alcohol can be used alone or in combination with another alcohol.

In an embodiment, non-limiting examples of initiators include 1-octanol, isopropanol, propanediol, trimethylolpropane, 2-butanol, 3-buten-2-ol, 1,3-butanediol, 1,4-butanediol, 1,6-hexanediol, 1,7-heptanediol, benzyl alcohol, 4-bromophenol, 1,4-benzenedimethanol, and (4-trifluoromethyl) benzyl alcohol; preferably, said compound of formula (IV) is selected from 1-octanol, isopropanol, and 1,4-butanediol.

The polymerization can be performed at a temperature of 60° C.-200° C. The temperature is preferably that of the reaction itself. According to an embodiment, without solvent, the polymerization can be performed at a temperature of 110° C.-190° C. in bulk.

In an embodiment, the at least one second polymer (b) can be polylactide-polyurethane. Non-limiting examples of suitable polylactide-urethanes are described in WO2010/133419 hereby incorporated by reference.

Preferably, the composition comprises:
(a) polylactide-polybutadiene (PLA-PB) block copolymer and (b) polylactide; preferably wherein the composition comprises from 40 to 99% by weight of said polylactide (b) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 75% by weight, for example from 50% to 75% by weight of said polylactide (b) based on the total weight of the composition.

Preferably, the composition comprises: (a) polylactide-polybutadiene (PLA-PB) block copolymer and (b) polylactide; preferably wherein the composition comprises from 50 to 80% by weight of said polylactide (b) based on the total weight of the composition; for example from 50% to 70% by weight, for example from 50% to 75% by weight of said polylactide (b) based on the total weight of the composition.

For example, the composition can comprise:
(a) poly-L-lactide-polybutadiene (PLLA-PB) block copolymer, and (b) poly-L-lactide; preferably wherein the composition comprises from 40 to 99% by weight of said poly-L-lactide (b) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 75% by weight, for example from 50% to 75% by weight of said poly-L-lactide (b) based on the total weight of the composition.

Preferably, the composition comprises: (a) poly-L-lactide-polybutadiene (PLLA-PB) block copolymer, and (b) poly-L-lactide; preferably wherein the composition comprises from 50 to 80% by weight of said poly-L-lactide (b) based on the total weight of the composition; for example from 50% to 70% by weight, for example from 50% to 75% by weight of said poly-L-lactide (b) based on the total weight of the composition.

For example, the composition can comprise:
(a) poly-D-lactide-polybutadiene (PDLA-PB) block copolymer, and (b) poly-D-lactide; preferably wherein the composition comprises from 40 to 99% by weight of said poly-D-lactide (b) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example from 45% to 75% by weight, for example from 50% to 75% by weight of said poly-D-lactide (b) based on the total weight of the composition.

Preferably, the composition comprises: (a) poly-D-lactide-polybutadiene (PDLA-PB) block copolymer, and (b) poly-D-lactide; preferably wherein the composition comprises from 50 to 80% by weight of said poly-D-lactide (b) based on the total weight of the composition; for example from 50% to 70% by weight, for example from 50% to 75% by weight of said poly-D-lactide (b) based on the total weight of the composition.

For example, the composition can comprise:
(a) polylactide-polybutadiene (PLA-PB) block copolymer and (b) polylactide, wherein the composition comprises 1 to 60% by weight of said polylactide-polybutadiene block copolymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 20% to 45% by weight, for example from 25% to 50% by weight, for example from 25% to 45% by weight of said poly-lactide-polybutadiene block copolymer (a) based on the total weight of the composition; and preferably wherein the composition comprises from 50 to 98% by weight of said polylactide (b) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example 45% to 75% by weight, for example from 50% to 75% by weight of said polylactide (b) based on the total weight of the composition.

Preferably, the composition comprises: (a) polylactide-polybutadiene (PLA-PB) block copolymer and (b) polylactide, wherein the composition comprises 20 to 50% by weight of said polylactide-polybutadiene block copolymer (a) based on the total weight of the composition; for example from 20% to 45% by weight, for example from 25% to 50% by weight, for example from 30% to 50% by weight, for example from 25% to 45% by weight of said poly-lactide-polybutadiene block copolymer (a) based on the total weight of the composition; and preferably wherein the composition comprises from 50 to 80% by weight of said polylactide (b) based on the total weight of the composition; for example from 55% to 80% by weight, for example from 50% to 70% by weight, for example from 50% to 75%, for example from 55% to 75% by weight by weight of said polylactide (b) based on the total weight of the composition.

For example, the composition can comprise:
(a) poly-L-lactide-polybutadiene (PLLA-PB) block copolymer, and (b) poly-L-lactide; preferably wherein the composition comprises 1 to 60% by weight of said poly-L-lactide-polybutadiene block copolymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 20% to 45% by weight, for example from 25% to 50% by weight, for example from 25% to 45% by weight of said poly-L-lactide-polybutadiene block copolymer (a) based on the total weight of the composition; and preferably wherein the composition comprises from 40% to 99% by weight of said poly-L-lactide (b) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example 45% to 75% by weight, for example from 50% to 75% by weight of said poly-L-lactide (b) based on the total weight of the composition.

Preferably, the composition comprises: (a) poly-L-lactide-polybutadiene (PLLA-PB) block copolymer, and (b) poly-L-lactide; preferably wherein the composition comprises 20 to 50% by weight of said poly-L-lactide-polybutadiene block copolymer (a) based on the total weight of the composition; for example from 20% to 45% by weight, for example from 25% to 50% by weight, for example from 30% to 50% by weight, for example from 25% to 45% by weight of said poly-L-lactide-polybutadiene block copolymer (a) based on the total weight of the composition; and preferably wherein the composition comprises from 50% to 80% by weight of said poly-L-lactide (b) based on the total weight of the composition; for example from 55% to 80% by weight, for example from 50% to 70% by weight, for example from 50% to 75% by weight, for example from 55% to 75% by weight of said poly-L-lactide (b) based on the total weight of the composition.

For example, the composition can comprise:
(a) poly-D-lactide-polybutadiene (PDLA-PB) block copolymer, and (b) poly-D-lactide; preferably wherein the composition comprises 1 to 60% by weight of said poly-D-lactide-polybutadiene block copolymer (a) based on the total weight of the composition; for example from 1% to 55% by weight, for example from 2% to 55% by weight, for example from 2% to 50% by weight, for example from 3% to 50% by weight, for example from 4% to 55% by weight, for example from 4% to 50% by weight, for example from 5% to 55% by weight, for example preferably from 5% to 52% by weight, for example from 5% to 50% by weight, for example preferably from 10% to 55% by weight, for example from 10% to 50% by weight, preferably from 15% to 55% by weight, for example from 20% to 55% by weight, for example from 20% to 50% by weight, for example from 20% to 45% by weight, for example from 25% to 50% by weight, for example from 25% to 45% by weight of said poly-D-lactide-polybutadiene block copolymer (a) based on the total weight of the composition; and preferably wherein the composition comprises from 40% to 99% by weight of said poly-D-lactide (b) based on the total weight of the composition; for example from 45% to 98% by weight; for example from 45% to 97% by weight, for example from 50% to 97% by weight, for example from 45% to 95% by weight, for example from 50% to 95% by weight, for example from 45% to 90% by weight, for example from 50% to 90% by weight, for example from 45% to 85% by weight, for example from 50% to 85% by weight, for example from 45% to 80% by weight, for example from 50% to 80% by weight, for example from 45% to 70% by weight, for example from 50% to 70% by weight, for example 45% to 75% by weight, for example from 50% to 75% by weight of said poly-D-lactide (b) based on the total weight of the composition.

Preferably, the composition comprises:
(a) poly-D-lactide-polybutadiene (PDLA-PB) block copolymer, and (b) poly-D-lactide; preferably wherein the composition comprises 20 to 50% by weight of said poly-D-lactide-polybutadiene block copolymer (a) based on the total weight of the composition; for example from 20% to 45% by weight, for example from 25% to 50% by weight, for example from 30% to 50% by weight, for example from 25% to 45% by weight of said poly-D-lactide-polybutadiene block copolymer (a) based on the total weight of the composition; and preferably wherein the composition comprises from 50% to 80% by weight of said poly-D-lactide (b) based on the total weight of the composition; for example from 55% to 80% by weight, for example from 50% to 70% by weight, for example from 50% to 75% by weight, for example from 55% to 75% by weight of said poly-D-lactide (b) based on the total weight of the composition.

In an embodiment, the composition comprises:
from 1% to 60% by weight of polylactide-polybutadiene block copolymer based on the total weight of the composition; and from 40% to 99% by weight of the second polymer (b1) based on the total weight of the composition.

In an embodiment, the composition comprises:
from 1% to 60% by weight of polylactide-polybutadiene block copolymer based on the total weight of the composition; and from 40% to 99% by weight of polylactide (b) based on the total weight of the composition.

According to the second aspect, the present invention also encompasses a process for preparing a composition according to the present invention, comprising the step of:
contacting (a) at least one first polymer selected from polylactide-polybutadiene (PLA-PB) block copolymer, polylactide-urethane-polybutadiene block copolymer, or a mixture thereof;
with (b) at least one second polymer selected from polylactide, polylactide-urethane, or a mixture thereof.

Any process known in the art can be applied for preparing a composition as presently described.

In some embodiments, said contacting step comprises melt blending the at least one first polymer with the at least one second polymer. In some embodiments, said melt blending process occurs, in a single step. The blending may occur by introducing the first polymer and the second polymer, into a system capable of combining and melting the components to initiate chemical and/or physical interactions between the first and second polymer components. For example, the blending may be accomplished by introducing the first and second polymers into a batch mixer, continuous mixer, single screw extruder or twin screw extruder, for example, to form a homogeneous mixture or solution while providing temperature conditions so as to melt the blend components and initiate chemical and physical interactions the first and second polymer components as described above.

In an embodiment, the composition is prepared by extrusion. In an embodiment, the composition is extruded at a temperature of at least 140° C., for example at least 150° C., for example at least 160° C., for example ranging from 160° C. to 230° C. More preferably, the composition is extruded at a temperature ranging from 180° C. to 230° C.

In a preferred embodiment, said contacting step comprises melt processing a blend comprising polylactide-polybutadiene (PLLA-PB) block copolymer and polylactide.

In an embodiment, said contacting step comprises melt processing a blend comprising poly-L-lactide-polybutadiene (PLLA-PB) block copolymer and poly-L-lactide.

In an embodiment, said contacting step comprises melt processing a blend comprising poly-L-lactide-polybutadiene (PDLA-PB) block copolymer and poly-D-lactide.

In a preferred embodiment, the residence time in the extruder is at most 30 minutes, more preferably at most 20 minutes, more preferably at most 10 minutes, more preferably at most 8 minutes, more preferably at most 5 minutes. As used herein, the term "residence time" refers to the time wherein the mixture is present in the extruder, or is present in a series of extruders.

In an embodiment, any of the previously described compositions may further comprise additives to impart desired physical properties, such as printability, increased gloss, or a reduced blocking tendency. Examples of additives may include, without limitation, stabilizers, ultra-violet screening agents, oxidants, anti-oxidants, antistatic agents, ultraviolet light absorbents, fire retardants, processing oils, mold release agents, coloring agents, pigments/dyes, fillers or combinations thereof, for example. These additives may be included in amounts effective to impart desired properties.

In some embodiments, said process for preparing a composition according to the present invention, further comprises processing the composition using one or more polymer processing techniques selected from film, sheet, pipe and fiber extrusion or coextrusion; blow molding; injection molding; rotary molding; foaming; 3D printing, and thermoforming.

The present invention is also directed towards the use of polylactide-polybutadiene block copolymer, polylactide-urethane-polybutadiene block copolymer, or a mixture thereof; as impact modifier to improve melt strength and impact strength for PLA.

The present invention also encompasses the use of polylactide-polybutadiene block copolymer, polylactide-urethane-polybutadiene block copolymer, or mixtures thereof as impact modifier for polymers.

The compositions of the invention were found to have greatly improved the impact properties over the polylactide alone.

The present invention also encompasses polymers, membranes, adhesives, foams, sealants, molded articles, films, extruded articles, fibers, elastomers, composite material, adhesives, organic LEDs, organic semiconductors, and conducting organic polymers, 3D printed articles, comprising the composition according to the present invention.

The present invention also encompasses an article comprising a composition according to any of the embodiments previously described for the present invention, or prepared using a process according to the invention.

In some embodiments, said article comprising a composition according to any of the embodiments previously described for the present invention, or prepared using a process according to the invention; is a shaped article.

In some embodiments, said shaped article comprising a composition according to any of the embodiments previously described for the present invention, or prepared using a process according to the invention; is a molded article.

In an embodiment, said shaped article is produced by polymer processing techniques known to one of skill in the art, such as blow molding, injection molding, rotary molding, compression molding; 3D printing, and thermoforming.

In an embodiment, the compositions and blends thereof may be formed into a wide variety of articles such as films, pipes, fibers (e.g., dyeable fibers), rods, containers, bags, packaging materials, 3D printed articles, and adhesives (e.g., hot melt adhesives) for example, by polymer processing techniques known to one of skill in the art, such as forming operations including film, sheet, pipe and fiber extrusion and co-extrusion as well as blow molding, injection molding, rotary molding, 3D printing, and thermoforming, for example. Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, hot melt adhesives, sheets, such as thermoformed sheets (including profiles and plastic corrugated cardboard), geomembranes and pond liners, for example. Molded articles include single and multilayered constructions in the form of bottles, tanks, large hollow articles, rigid food containers and toys, for example.

The present invention can be further illustrated by the following examples, although it will be understood that these examples are included merely for purposes of illustration and are not intended to limit the scope of the invention unless otherwise specifically indicated.

EXAMPLES

Unless otherwise indicated, all parts and all percentages in the following examples, as well as throughout the specification, are parts by weight or percentages by weight respectively.

Example 1 Preparation of Poly-L-lactide-polybutadiene (PLLA-PB) Block Copolymer PLLA-PB-PLLA block copolymer was prepared by reacting hydroxy terminated polybutadiene (Krasol® LBH10000 from HSC Cray Valley Corp) with L-lactide in bulk, in the presence of a catalyst to prepare the copolymer. Krasol® LBH10000 from HSC Cray Valley Corp, had the following properties: Microstructure: 1,2-(vinyl): about 65 wt %, 1,4-cis: about 18 wt %; 1,4-trans: about 17 wt %; Content of OH groups 0.16-0.22 (Mmol/g), Hydroxyl number 8.9-12.4 Mg KOH/g, Viscosity Brookfield 20-50 Pa·s at 50° C. Density: about 0.9 g/cm$^3$ at 20° C.; Molecular weight (Mn): 9000-11000 g/mol; Polydispersity Index (Mw/Mn): 1.1. Purified L-Lactide from Futerro optical purity above 99.5% was used. Hydroxy terminated polybutadiene (7.78 g) and L-lactide (8.0 g) were heated to 185° C. under N$_2$ until a clear mixture was obtained. Sn(Oct)$_2$ (112 mg) was added. Polymerization was carried out for 30 min and the product (block copolymer 1) was precipitated in ethanol.

The modulus of the copolymer was measured as described in ISO 527-1BA. The result is shown in Table 1, and compared with the modulus for PLA (PLLA (NatureWorks® PLA polymer 6201D).

TABLE 1

Modulus on PLLA-PB-PLLA copolymer (tensile-20 mm/min-100%/min) at 23° C.

| Example | PB quantity % | HO-PB-OH (Mn) g · mol$^{-1}$ | Conversion % | Mn theoretic g · mol$^{-1}$ | Haze % | Modulus Mpa |
|---|---|---|---|---|---|---|
| PLA6201 | 0 | | | | <10 | 3260 |
| Copolymer 1 | 52 | 10.000 | 95 | 19.250 | <10 | 20 |

Example 2

Compositions 1 and 2 according to an embodiment of the invention were prepared by blending PLLA (Synterra® PLLA 2010 from Synbra technology b.v) with PLLA-PB-PLLA block copolymer 1 prepared in example 1. The physical properties of Synterra® PLLA 2010 are shown in Table 2. Comparative composition 3 is prepared by blending PLLA (Synterra® PLLA 2010 from Synbra technology b.v) with PLLA-PB-PLLA block copolymer 1 prepared in example 1. Comparative composition 4 consisted of pure PLLA (Synterra® PLLA 2010 from Synbra technology b.v).

TABLE 2

| PHYSICAL PROPERTIES | TEST METHOD | UNITS | SPECIFICATION |
|---|---|---|---|
| Appearance | | | round pellets |
| Color | | | Off white (crystallized) |
| Melt Flow Rate | ISO 1133 (190° C./2.16 kg) | g/600 s | 4 (+− 2) |
| Polymer Density | ISO 1183 | g/cm$^3$ | 1.25 |
| Moisture content | | | <400 ppm |
| Residual Monomer | | % | <0.5 |
| D-Isomer | | % | <1 |
| Melting temperature | DSC: ISO 11357 | ° C. | 175-180 |
| Glass Transition temperature | DSC: ISO 11357 | ° C. | 55-60 |

PLLA pellets were dried in a dryer for 1 hour at 110° C. The recipes of the compositions are shown in Table 3.

TABLE 3

| Compositions | PLLA 2010 (wt %) | PLLA-PB-PLLA Block copolymer 1 (wt %) |
|---|---|---|
| Composition 1 | 70 | 30 |
| Composition 2 | 60 | 40 |
| Comparative composition 3 | 90 | 10 |
| Comparative composition 4 | 100 | 0 |

Composition 1 was melt blended in a (Haake) counter-rotating twin screw mini-extruder, at 4 bars, 200° C., 100 rpm and a residence time of 3 min for 5 passes.

Composition 2 was melt blended in a (Haake) counter-rotating twin screw mini-extruder, at 190° C., 50 rpm and a residence time of 5 min.

Composition 3 is melt blended in a (Haake) counter-rotating twin screw mini-extruder, at 4 bars, 200° C., 100 rpm and a residence time of 3 min for 5 passes.

Composition 4 was melt blended in a (Haake) counter-rotating twin screw mini-extruder, at 190° C., 50 rpm and a residence time of 5 min.

Figure 1:
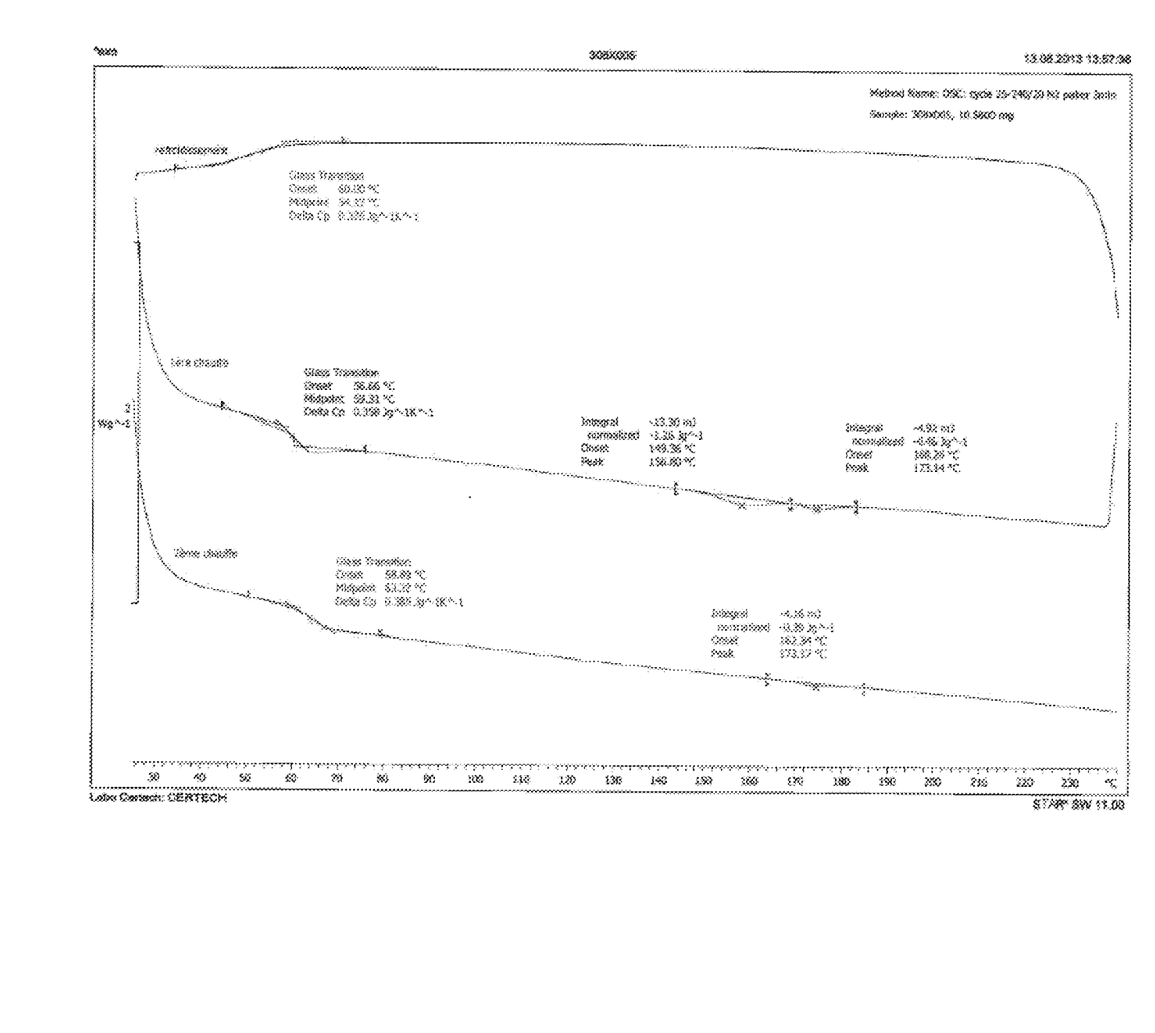
FIG. 1 represents a graph showing the DSC profile of composition 2 according to an embodiment of the invention.

Thermal properties of composition 2 were analyzed with Perkin-Elmer Pyris Diamond differential scanning calorimeter (DSC) calibrated with indium as standard. The specimen was heated from 25 to 240° C. at a rate of 20° C./min, under $N_2$, followed by an isothermal at 240° C. for 3 min, and a subsequent cooling scan to 25° C. at a rate of 20° C./min. And then were reheated to 240° C. at 20° C./min. Glass transition temperature (Tg), melting temperature (Tm) and the enthalpy of melting (ΔHm) were measured. The DSC thermogram of the composition 2 is presented in FIG. 1.

Mechanical properties of the compositions were investigated by Izod impact tester. Un-notched Izod impact was measured at 23° C. according to ISO180. Unnotched test specimen 9.99 mm×4.21 mm (section 42.1 mm$^2$) is held as a vertical cantilevered beam and is impacted at 3.5 m/s by a swinging pendulum (5.5 J).

The results are shown in Table 4.

TABLE 4

| Compositions | Un-notched Izod (kJ/m$^2$) |
|---|---|
| Composition 1 | ND |
| Composition 2 | 73.8 |
| Composition 3 | 15-20 |
| Composition 4 | 15 |

ND: not determined

Comparative compositions comprising poly-L-lactide identified below as PLA 6201 (Ingeo™ 6201D from NatureWorks LLC) or PLA 2002D (from NatureWorks LLC), optionally in the presence of commercial impact modifiers were tested. The physical properties of PLA 6201D and PLA 2002D are shown in Table 5. As impact modifier either Opaque Impact Modifier BioStrength® 150 or Transparent acrylic core shell impact modifier BioStrength® 280 from Arkema were used.

TABLE 5

| Physical Properties | | ASTM method |
|---|---|---|
| Ingeo 6201D | | |
| Specific Gravity | 1.24 | D792 |
| Relative Viscosity | 3.1 | CD internal Viscotek Method |

TABLE 5-continued

| Physical Properties | | ASTM method |
|---|---|---|
| Melt Index, g/10 min (210° C.) | 15-30 | D1238 |
| Melt Density (230° C.) | 1.08 | |
| Glass Transition Temperature (° C.) | 55-60 | D3417 |
| Crystalline Melt Temperature (° C.) | 155-170 | D3418 |
| D-isomer (%) | 1.4 | |
| PLA Polymer 2002D | | |
| Specific Gravity | 1.24 | D792 |
| Melt Index, g/10 min | 4-8 (190° C.) | D1238 |
| Clarity | Transparent | |
| Mechanical Properties | | |
| Tensile Strength @ Break, psi (MPa) | 7,700 (53) | D882 |
| Tensile Yield Strength, psi (MPa) | 8,700 (60) | D882 |
| Tensile Modulus, kpsi (GPa) | 500 (3.5) | D882 |
| Tensile Elongation, % | 6.0 | D882 |
| Notched Izod Impact, (J/m) | 12.81 | D256 |
| D-isomer (%) | 2-2.5 | |

The mechanical properties of the compositions were investigated by Izod impact tester, and the results are shown in Table 6. The compositions comprising impact modifier were not transparent.

TABLE 6

| Samples | | Notched (ISO180) | | Unnotched (ISO180) | |
|---|---|---|---|---|---|
| | | Absorbed energy | Resilience kJ/m$^2$ | Absorbed energy | Resilience kJ/m$^2$ |
| Neat PLA 6201 | Neat PLA | 0.084 | 2.5 | 0.6 | 14.6 |
| PLA 2002 + 2% Biostrength ® 150 | 2% BS 150 | 0.099 | 2.9 | 0.83 | 19.9 |
| PLA 6201 + 5% Biostrength ® 150 | 5% BS 150 | 0.117 | 3.667 | 1.138 | 27.6 |
| PLA 6201 + 10% Biostrength ® 150 | 10% BS 150 | 0.276 | 8.7 | 1.751 | 42.6 |
| PLA 6201 + 15% Biostrength ® 150 | 15% BS 150 | 0.820 | 25.57 | 5.487 | 133.5 |
| PLA 6201 + 5% Biostrength ® 280 | 5% BS 280 | 0.115 | 3.60 | 0.881 | 21.4 |
| PLA 6201 + 10% Biostrength ® 280 | 10% BS 280 | 0.194 | 5.90 | 1.395 | 33.9 |
| PLA 6201 + 15% Biostrength ® 280 | 15% BS 280 | 0.227 | 6.90 | 2.232 | 54.2 |

The invention claimed is:
1. A composition comprising:
  (a) at least one first polymer, wherein the first polymer is a polylactide-urethane-polybutadiene block copolymer or a mixture of a polylactide-urethane-polybutadiene block copolymer and a PLA-PB block copolymer wherein the polybutadiene in the PLA-PB block copolymer has a number average molecular weight of between 1000 and 20,000 g/mol; and
  (b) at least one second polymer selected from polylactide, polylactide-urethane, or a mixture thereof,
    wherein the composition comprises from 20% to 50% by weight of said first polymer based on the total weight of the composition and from 50% to 80% by weight of said second polymer based on the total weight of the composition.

2. The composition according to claim 1, wherein said composition is obtained by melt blending the at least one first polymer with the at least one second polymer.

3. The composition according to claim 1, comprising from 25% to 50% by weight of the first polymer based on the total weight of the composition; and from 50% to 80% by weight of the second polymer (b) based on the total weight of the composition.

4. The composition according to claim 1, comprising from 25% to 50% by weight of the first polymer based on the total weight of the composition; and from 50% to 80% by weight of polylactide (b) based on the total weight of the composition.

5. An article comprising a composition according to claim 1.

6. The composition according to claim 1, wherein the wherein the polybutadiene in the PLA-PB block copolymer has a hydroxyl group content of from 0.10 to 3.0 Mmol/g.

7. The composition of claim 1, wherein the polybutadiene in the PLA-PB block copolymer is a branched hydroxyl-terminated polybutadiene with between 1.95 and 2.8 hydroxyl groups/molecule.

8. The composition of claim 1, wherein the polybutadiene in the PLA-PB block copolymer is a copolymer.

* * * * *